Dec. 2, 1958  W. F. M. GRAY ET AL  2,863,130
COIL CONSTRUCTION FOR ELECTROMAGNETIC INDUCTION APPARATUS
Filed March 21, 1957  2 Sheets-Sheet 1

Inventors,
Willard F. M. Gray,
Russell D. Wheeler,
by Gilbert P. Tarleton
Their Attorney.

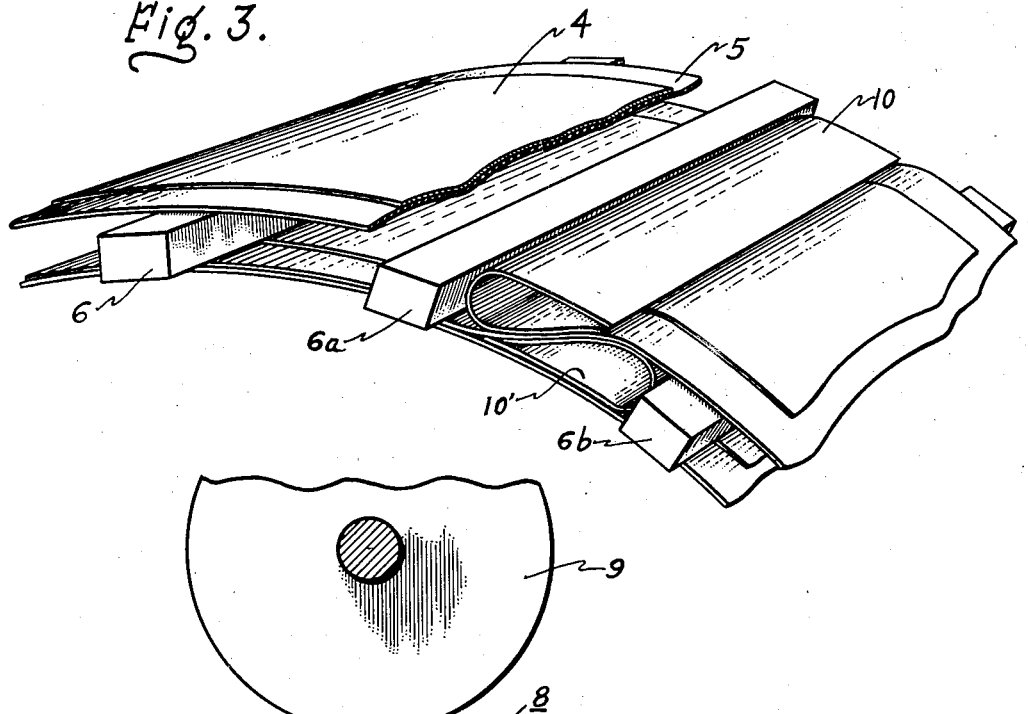
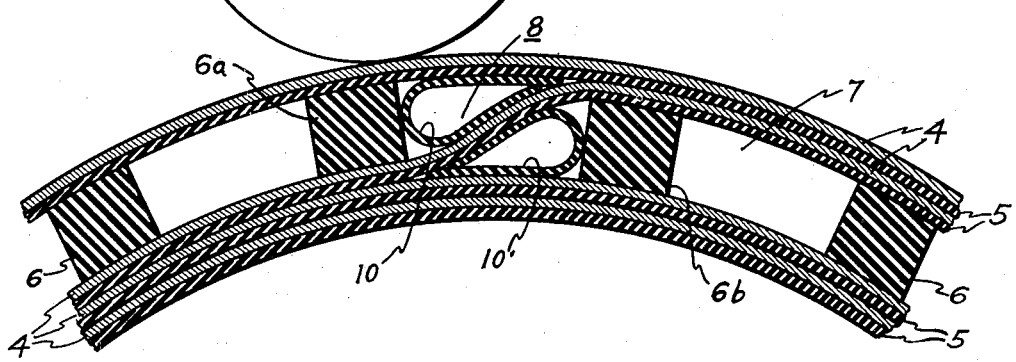

United States Patent Office 2,863,130
Patented Dec. 2, 1958

2,863,130

COIL CONSTRUCTION FOR ELECTROMAGNETIC INDUCTION APPARATUS

Willard F. M. Gray, Pittsfield, Mass., and Russell D. Wheeler, Mellenville, N. Y., assignors to General Electric Company, a corporation of New York Application March 21, 1957, Serial No. 647,597

9 Claims. (Cl. 336—207)

The present invention relates to electromagnetic induction apparatus, and particularly to foil-wound coils for electromagnetic induction apparatus such as transformers, reactors and the like.

Foil-wound transformers, i. e., transformers having coil windings formed of concentrically wound insulated foil, offer numerous advantages over the more conventional transformers employing wire coil windings. The foil-wound coil occupies less space and its improved electrical properties makes it possible to reduce the size of the core without sacrifice of electrical capacity of the transformer. Of particular advantage is the relative ease of winding the foil and inserting tap leads therein, operations which lend themselves quite readily to mechanization, in contrast to the usual wire coil construction in which many hand operations are necessary.

Provision is usually made in the foil-wound coils for ducts through which cooling media such as oil or air may be circulated during the operation of the transformer. To form such ducts, spacer bars are normally inserted at intervals between turns in the coil during the coil winding procedure. A problem which arises from the provision of these duct-forming spacers is the likelihood of creasing or damaging the thin insulation and foil sheets at the region (referred to herein as the transition or crossover point) where they pass through the row of spacers forming a series of ducts. Damage occurring at this point to the foil or insulation may contribute to poor electrical properties of the foil winding during operation and may lead to premature breakdown of the transformer under operating conditions.

It is an object of the present invention to provide a foil-wound coil for electromagnetic induction apparatus, especially for transformers, which avoids the above disadvantages.

It is a further object of the invention to provide electromagnetic induction apparatus of the above type having cooling ducts therein and wherein the foil-wound coil is characterized by smooth, tight windings.

It is another object of the invention to provide a foil-wound coil of the above type having duct-forming spacers and wherein means are provided to protect the insulated foil winding from damage by the spacers.

It is still another object of the invention to provide protecting means of the above type for the coil winding at the transition point in the series of ducts, wherein the protecting means serves as support means during the winding, permits passage of cooling media through the transition point, and is easily and economically constructed.

With the above objects in view, the present invention relates to a coil construction for electromagnetic induction apparatus, comprising a concentric winding of insulated foil means, spacer members arranged between adjacent turns of the concentric winding and forming ducts extending therethrough, with the insulated foil means crossing from one side of the spacer members to the other through one of the ducts, and means arranged in the duct between the crossing portion of the insulated foil means and the spacer members for protecting the portion of the insulated foil means crossing the duct while leaving a passage through the duct. In a preferred embodiment of the invention, the foil protecting means comprises a pair of compressible tubular members of the form disclosed herein arranged in the spaces defined in the winding at the crossover point between the adjacent spacer members and the insulated foil sheet passing therebetween.

The invention will be better understood from the following description taken in conjunction with the accompanying drawings, in which:

Fig. 3 is a detailed view in perspective showing arrangement of the protective insert members in the coil winding; and Fig. 4 is a cross-sectional view of the arrangement shown in Fig. 3.

Figure 1:
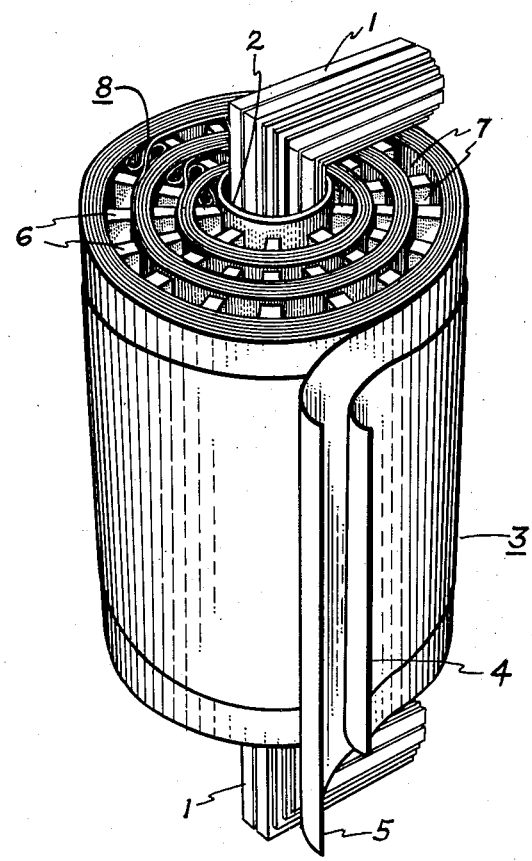
Fig. 1 is a fragmentary view in perspective of a foil-wound transformer incorporating a coil construction in accordance with the present invention.

Referring now to the drawings, and particularly to Fig. 1, there is shown a transformer comprising a core 1, a central insulating cylinder 2, and a foil-wound coil 3 wrapped concentrically around insulating cylinder 2. Coil 3 comprises a sheet of metal foil 4, such as aluminum, and one or more sheets of insulation material 5, such as paper, interwound with the foil sheet so as to provide alternating layers of foil and insulation in the wound coil. Normally the insulating sheet 5 is made wider than the metal foil 4 so as to extend laterally beyond the edges of the foil, in order to serve as a barrier against corona or arcing between the edges of the metal foil. Instead of comprising separate sheets, the winding may be formed of an integral composite sheet of insulating and conductive material, or any other equivalent insulated foil structure which provides turns of conducting material separated by insulation. As used herein, the expression "insulated foil means" is intended to include any of such integral or separate sheets of material used for forming the coil.

Coil 3 may constitute either the primary or secondary winding of the transformer, with the other winding (not shown) being arranged either on a different core leg or placed over the first coil concentric therewith, in accordance with known practice. To insure proper cooling of the coil 3 during transformer operation, spacer bars 6 are arranged at intervals between certain coil turns, the bars 6 extending generally axially between the coil ends to define ducts 7 through which cooling media such as oil or air may circulate during operation of the transformer.

As is observed in the coil winding illustrated in Fig. 1, and shown in greater detail in Fig. 4, the associated foil and insulation sheets 4, 5, in the course of being wound around the series of duct-forming spacer bars 6, cross between adjacent bars 6a, 6b in passing through the transition or crossover point designated generally by numeral 8. In passing over the corners of spacer bars 6a, 6b at the crossover point, the thin sheets of foil and insulation are subject to substantial risk of damage due to the corners creasing or tearing the sheets, particularly in view of the considerable tension applied to the sheets in order to wind them in tight uniform layers. The danger of such damage is further increased by the pressure of a contact roller 9 (see Fig. 4), normally used to press the sheets firmly against the underlying coil surface, which forces the sheets even more tightly around the sharp corners of spacers 6, especially in the absence of support at the intervening ducts to prevent the periphery of the contact roller 9 from rolling around the corners to an appreciable degree.

To provide such support for the contact roller 9, removable members may be arranged in the ducts or other means may be used as disclosed in the co-pending application of Gray et al., Serial No. 646,313, filed March 15, 1957, and assigned to the same assignee as the present invention. Such means are not feasible, however, for use in the region of transition ducts 8 due to the crossing of the winding sheet therein.

To overcome this difficulty, there are provided in accordance with the invention elongated tubular members 10, 10' on opposite sides of foil sheets 4, 5 in the triangular spaces at the crossover point 8 between the sheets 4, 5 and the adjacent spacer bars 6a, 6b. The protective members 10, 10' are preferably shaped and proportioned in a tear-drop or pear-shaped form as shown, wherein the enlarged bend portion 10a (see Fig. 2) is somewhat compressible, so as to provide a yieldable support for the wound insulating and foil sheets overlying opposite sides of the row of duct spacers, as well as for the sheets crossing over at transition point 8. In addition, the protective members 10, 10' provide a gradually sloping surface on which the coil sheets may be laid at the crossover point to avoid a sharp bending of the sheets in that region.

Figure 2:
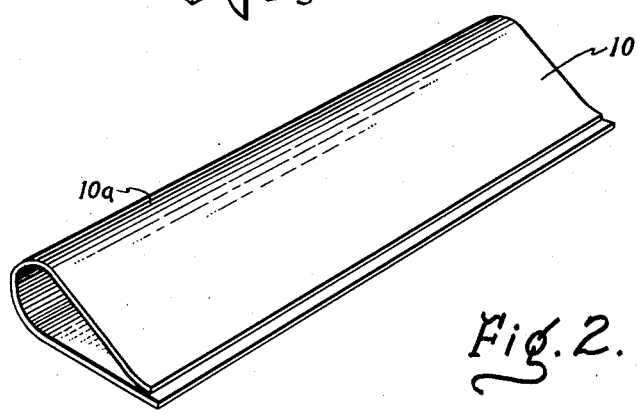
Fig. 2 is a perspective view of the combined protective and channel-forming member of the invention.

The tubular protective member 10, shown separately in Fig. 2, may be easily and economically made from a rectangular sheet of suitable dimensions which is folded over to form a channel of substantially pear-shaped configuration, the contacting edge portions being glued together or otherwise joined along their length. A particularly satisfactory material for the purposes of the invention is a sheet of pressboard of about $\frac{1}{32}$ inch thick. The invention, however, is not limited to this material nor to the described method of forming it. Protective members of other material such as wood, horn fiber, metal or other composition can be used, provided they are stable under the conditions prevailing in the transformer or other apparatus in which they are used and are compatible with the insulating and cooling media employed in the apparatus. It is preferred, however, to use material which is resilient in the form illustrated so as to avoid unduly stressing the thin sheets at the crossover point.

In forming member 10 in the manner described above, it is of advantage to join the opposite edges in somewhat offset overlapping relation as shown in Fig. 2, so that the apex of the insert member 10 fits more snugly into the angle formed between the crossover portion of the winding and the underlying and overlying portions of the wound web. As seen in Fig. 4, insert members 10, 10' thus provide a substantially continuous somewhat yieldable supporting base for the crossover portion of the web and afford a gradual transition for the sheets between the inner and outer levels of the winding on opposite sides of the row of spacers 6.

The adhesive or other fastening means employed are preferably applied in as narrow a strip as possible while still providing secure attachment of the folded-over edges of member 10, to the end that the region near the apex of insert member 10 is not flattened to a substantial extent, but rather begins to diverge close to the apex. The proper pear-shaped configuration of the insert member is thereby achieved, and a more effective support is provided for the crossover web portion in the triangular spaces in which the protective members 10, 10' are positioned.

Although the invention is not limited to any particular manner of introducing the parts, the following is a typical procedure which may be used. At a stage in the winding procedure where it is desired to form a series of ducts, member 10' is first inserted with its apex extending into the nip between the turn just being laid on the coil and the underlying web. The first spacer bar 6b is then laid in against the insert member 10', and thereafter the spacer bars 6 are placed at intervals around the coil while the web is laid over them. When the final spacer 6a in this series is placed in position, insert member 10 is laid in against spacer 6a with its apex facing in a direction opposite to that of member 10'. The web being wound over the inserted bars 6 and members 10, 10' holds them in position and the winding continues around the coil in multiple layers until another series of ducts is desired, at which point the above procedure is repeated.

There is thus provided by the invention a simple and economical yet effective means for protecting the thin web structure of the winding at the crossover points in the coil ducts, for providing a support in these regions to ensure a smooth winding even under the impact of the pressure roller, and at the same time serving as a passage for circulation of cooling media through the crossover point.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A foil-wound coil comprising a concentric winding of insulated foil means, spacer members arranged between certain turns of said concentric winding defining duct means extending through said coil, a portion of said insulated foil means crossing from one side of said spacer members to the other side through said duct means, and supporting means arranged in said duct means for protecting said portion of said insulated foil means.

2. A foil-wound coil for electrical induction apparatus comprising a concentric winding of insulated foil means, spaced elongated members arranged between certain turns of said concentric winding defining duct means extending through said coil, a portion of said insulated foil means crossing from one side of said spaced elongated members to the other side through said duct means, and supporting means arranged in said duct means between said crossing portion of said insulated foil means and said spaced elongated members for protecting said portion of said insulated foil means while leaving a passage open through said duct means.

3. A foil-wound coil for electromagnetic induction apparatus comprising a concentric winding of insulated foil means, spaced elongated members arranged between certain turns of said concentric winding defining duct means extending through said coil, a portion of said insulated foil means crossing from one side of said spaced elongated members to the other side through said duct means, and yieldable insert means arranged in said duct means extending along the length thereof in contact with said crossing portion of said insulated foil means and said spaced elongated members for supporting said portion of said insulated foil means while providing a passage through said duct means.

4. A foil-wound coil for electromagnetic induction apparatus comprising a concentric winding of insulated foil means, a row of spaced elongated members arranged between certain turns of said concentric winding defining a series of ducts extending through said coil, a portion of said insulated foil means crossing from one side of said row of spaced elongated members to the other side through one of said ducts, said spaced elongated members, said crossing portion of said insulated foil means and the winding turns on opposite sides of said duct means mutually defining triangular channels on opposite sides of said crossing portion, and a hollow member arranged in each of said triangular channels extending therethrough and forming a support in said one duct for said crossing portion of said insulated foil means and said winding turns on opposite sides of said duct means while providing a passage through said one duct.

5. A foil-wound coil for electromagnetic induction apparatus comprising a concentric winding of insulated foil means consisting of associated sheets of insulating and foil material said insulating sheet material being wider than and projecting laterally beyond said foil material, spaced elongated members arranged between certain turns of said coil defining a plurality of radially spaced annular rows of ducts extending through said coil, a portion of said insulated foil means crossing from one side of each of said rows of ducts to the other side through one duct in each row, and yieldable elongated insert members arranged in each duct through which said insulated foil means passes, said insert members being in contact with said crossing portion of said insulated foil means and the spaced elongated members adjacent thereto for supporting said portions of said insulated foil means while providing a passage through the ducts in which said insert members are arranged.

6. A foil-wound coil for electrical induction apparatus comprising a concentric winding of insulated foil means, spaced elongated cornered members arranged between certain turns of said concentric winding defining duct means extending through said coil, a portion of said insulated foil means crossing from one side of said spaced members to the other side through said duct means and passing over the corners of said spaced members, said crossing portion of said insulated foil means, said spaced members and the winding turns on opposite sides of said duct means mutually defining triangular channels on opposite sides of said crossing portion, and a compressible tubular member of approximately pear-shaped cross-section arranged in each of said triangular channels extending therethrough with the apices of said members oppositely arranged and extending into the respective angles formed by the crossing portion of said insulated foil means and the adjacent winding turns and forming yieldable support in said duct means for said crossing portion of said insulated foil means and said winding turns on opposite sides of said duct means while providing a passage through said duct means.

7. A foil-wound coil for electrical induction apparatus comprising a concentric winding of insulated foil means, a row of spaced elongated members arranged between certain turns of said concentric winding defining a series of ducts extending through said coil, a portion of said insulated foil means crossing from one side of said row of spaced elongated members to the other side through one of said ducts, said spaced elongated members, said crossing portion of said insulated foil means and the winding turns on opposite sides of said duct means mutually defining triangular channels on opposite sides of said crossing portion, and a compressible tubular member of approximately pear-shaped cross-section arranged in each of said triangular channels extending therethrough with the apices of said members oppositely arranged and extending into the respective angles formed by the crossing portion of said insulated foil means and the adjacent winding turns and forming a support in said one duct for said crossing portion of said insulated foil means and said winding turns on opposite sides of said duct means while providing passage through said one duct, each tubular member being formed of a folded sheet of flexible material with one contacting edge portion joined to the other in overlapping, offset relation.

8. Electrical induction apparatus comprising core means, and a foil-wound coil surrounding said core means, said foil-wound coil comprising a concentric winding of insulated foil means, spacer members arranged between certain turns of said concentric winding defining duct means extending through said coil, a portion of said insulated foil means crossing from one side of said spacer members to the other side through said duct means, and supporting means arranged in said duct means between said crossing portion of said insulated foil means and said spacer members for protecting said portion of said insulated foil means while leaving a passage open through said duct means.

9. Electrical induction apparatus comprising core means, and a foil-wound coil surrounding said core means, said foil-wound coil comprising a concentric winding of insulated foil means, spaced elongated members arranged between certain turns of said concentric winding defining duct means extending through said coil, a portion of said insulated foil means crossing from one side of said spaced elongated members to the other side through said duct means, and hollow yieldable insert means arranged in said duct means extending along the length thereof in contact with said crossing portion of said insulated foil means and said spaced elongated members for supporting said portion of said insulated foil means while providing a passage through said duct means.

References Cited in the file of this patent

UNITED STATES PATENTS

| 1,935,182 | Fischer | Nov. 14, 1933 |
| 2,756,397 | Cederstrom | July 24, 1956 |